May 6, 1941.　　J. H. COPE ET AL　　2,240,552
SWEEP RAKE AND VEHICLE THEREFOR
Filed May 11, 1940　　3 Sheets-Sheet 3

INVENTORS
JOSEPH H. COPE
GAROLD C. J. GRAY
BY Marten E. Anderson

Patented May 6, 1941

2,240,552

UNITED STATES PATENT OFFICE 2,240,552

SWEEP RAKE AND VEHICLE THEREFOR

Joseph H. Cope, Denver, Colo., and Garold C. J. Gray, Hastings, Nebr., assignors to Western Land Roller Company, Hastings, Nebr., a co-partnership consisting of Chas. M. Anderson, M. George Anderson, Arthur H. Anderson, Edna F. Anderson, Paul Anderson and Carrie Glass Application May 11, 1940, Serial No. 334,538

4 Claims. (Cl. 56—27)

This invention relates to improvements in power operated sweep rakes and has reference more particularly to a mechanism for supporting the rake heads.

It is now quite customary to operate sweep rakes by means of gasoline tractor power and for this purpose various modifications of the horse operated sweep rakes have been made and some patented.

When sweep rakes are operated by tractor power it is customary to support the rake by wheels attached to the rake head and it is also customary to support the rake head from the tractor.

Where sweep rakes are supported from the tractor, the additional load that must be supported by the front wheels of the tractor becomes excessive with the result that the unusual strain put upon the front wheel tires serves to break them down and cause additional expense and trouble during the time that the rakes are thus employed.

Where the rakes are supported by separate wheels secured to the rake head, as shown for example in United States Patent No. 1,477,919, granted to Spinney December 18, 1923, complicated mechanisms must be employed for guiding the rake and such constructions also make it difficult to adjust the rake vertically with respect to the ground, which frequently becomes necessary where the best operation is desired.

The object of this invention is to produce a tractor operated, separate vehicle supported sweep rake that can be steered in the same manner as tractor supported sweep rakes so that sharp turns may be made in transporting the load.

In order to describe this invention in such a way that it may be readily understood, reference will now be had to the accompanying drawings in which the invention has been illustrated in its proved form and in which—

Figure 5 is a view showing the construction of the adjustable means employed for effecting a connection with the tractor.

Figure 1:
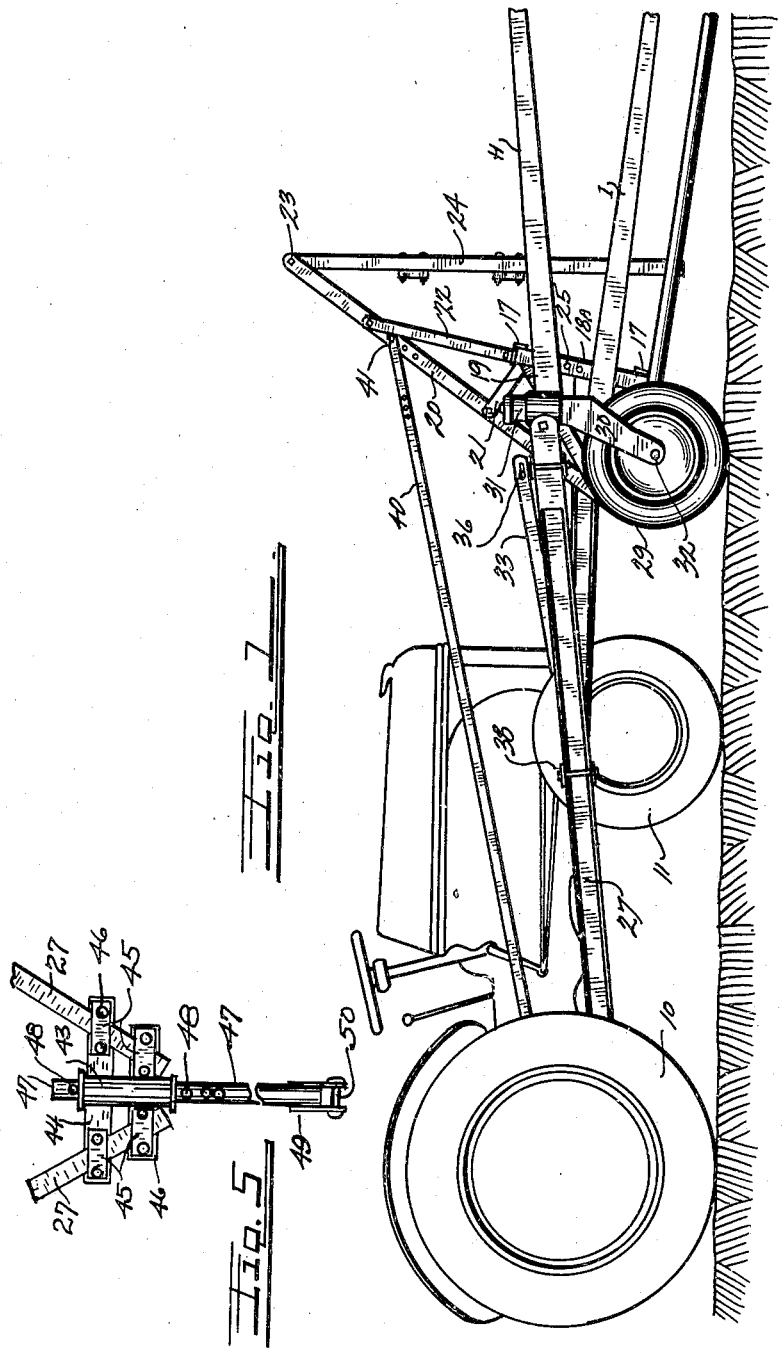
Figure 1 is a side elevation of the improved sweep rake and supporting vehicle showing the same connected with a tractor.

In the drawings the power vehicle has been illustrated as an ordinary farm tractor whose rear wheels have been designated by reference numeral 10 and whose front wheels have been designated by reference numeral 11. The tractor itself forms no part of this invention, except insofar as it forms an element of the combination and it will therefore not be described to any greater extent than necessary for the proper description of the rake supporting vehicle and the rake which form the subjects of this invention.

The rake head is of the usual construction but in order to describe the invention the construction of the rake head will have to be described in part and is as follows:

A plurality of rake teeth 12 are attached to two spaced parallel transverse angle irons 13 and 14 by bolts 15. Diagonal braces 16 serve to hold the rake teeth and transverse bars in a predetermined position. An angle iron 17 is positioned above the transverse bar 14 and is supported by a plurality of vertical angle irons 18. Braces 19 extend rearwardly from some of the vertical supports 18 to the rear ends of base members 19a so as to form stress triangles that positively hold the vertical supports in a predetermined relation to the plane of the rake head. At points spaced equi-distantly from the middle of the rake head are two bars 20 that extend upwardly a considerable distance above the transverse bar 17 and these are held in place by means of braces 21 that extend to and connect with the assembly comprising members 17, 18 and 19. Braces 22 are secured at the lower ends to the transverse bars 17 and at their upper ends to the bars 20. The braces 22 serve to hold these bars from transverse movement. Attached to the upper ends of bars 20 by means of pivots 23 is a "push-off" 24 which functions in a way similar to that shown in U. S. Letters Patent No. 1,684,264 of September 11, 1928. At two points spaced equi-distantly from the middle of the rake are positioned a pair of vertical angle irons 18a that are spaced a short distance apart. The opposing flanges of these pairs of angle irons are provided with openings 25 for the reception of pins by means of which the flattened ends of the supporting members 26 are secured in place and about which pins the rake head can pivot during operation.

The supporting bars 26 form part of a rake head supporting vehicle which will now be described.

The rake head is also provided with said members H and I.

Figure 2:
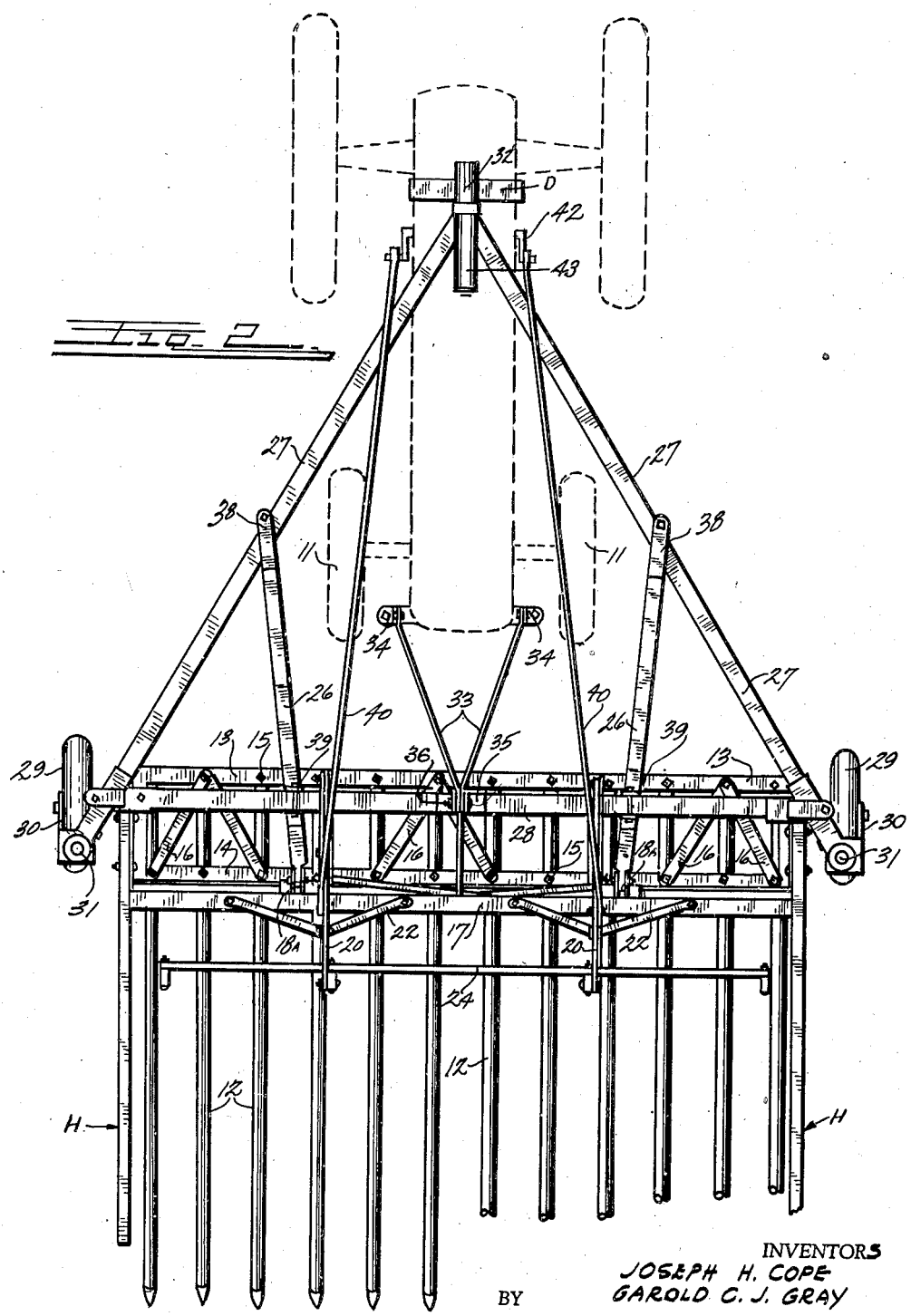
Figure 2 is a top plan view of the assembly shown in Figure 1, the position of the tractor being indicated by broken lines.
Figure 3:
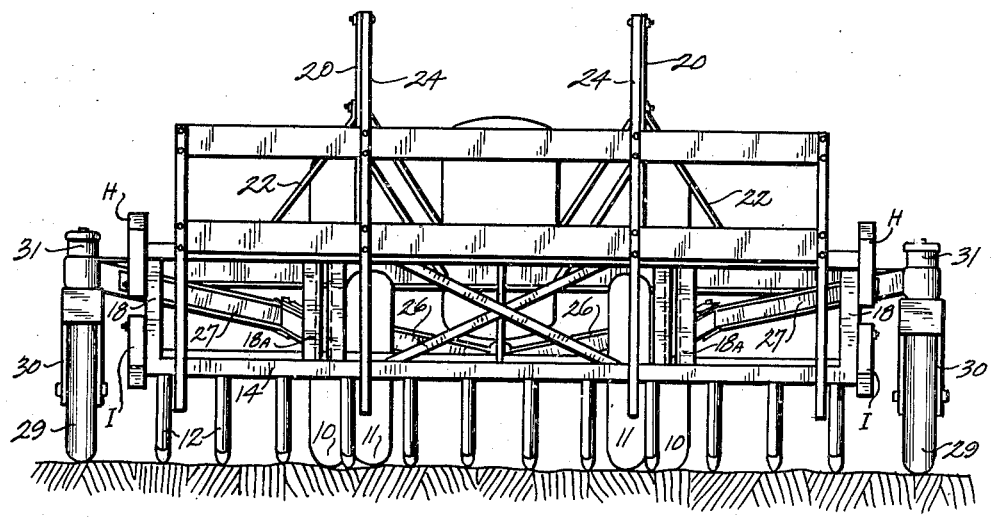
Figure 3 is a front elevation of the assembly shown in Figure 1.
Figure 4:
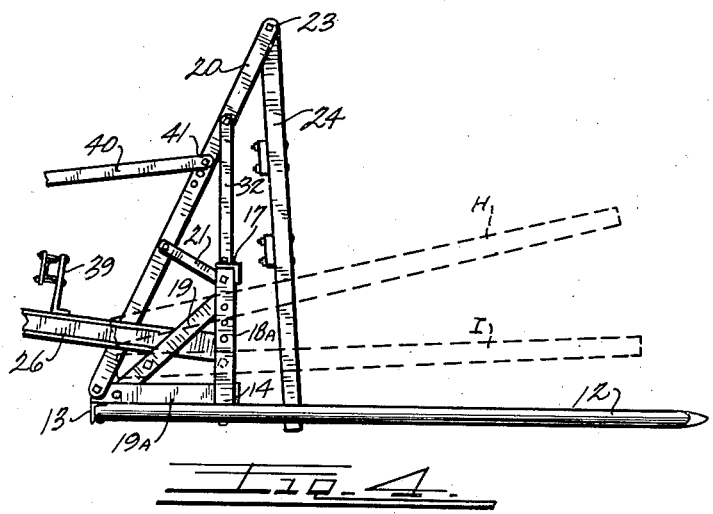
Figure 4 is a side elevation of the rake head show the same detached in part from the vehicle.

The supporting vehicle is made in the form of an isosceles triangle whose two sides have been designated by reference numeral 27 and whose base has been designated by reference numeral 28. From Figure 2 it will be seen that the ends of the side members project forwardly beyond the base and have secured to each end a castor wheel assembly. The actual construction of the caster wheel assembly will not be described in detail as it is of usual construction and comprises a wheel 29 that is mounted between the two arms of a fork 30. The fork is mounted for pivotal movement in a vertical bearing which has been designated by reference numeral 31. Since the pivot 32 about which the wheels 29 turn are located to the rear of the axis of the bearing 31 the caster wheels will be free to shift their position about the vertical axis so as to travel in the direction which is determined by the operator of the tractor. The sides 27 terminate in a coupling mechanism 32' by means of which an attachment is made with the draw bar D of the tractor.

It will be observed that the triangle comprising sides 27 and base 28 is such that it incloses the front wheels of the tractor. Brace members 33 have their rear ends pivotally secured to brackets 34 that are attached to the tractor and their front ends are positioned between spaced brackets 35, carried by the base member 28. The pivotal connection between the front ends of brace bars 33 and the supporting vehicle is effected by means of a pivot pin 36 that extends through the brackets 35 and through the braces 33. The pivot pin 36 extends through elongated openings in bars 33 so that no bending will take place when relative vertical movement occurs between the tractor and the rake supporting vehicle.

The rake head is supported from the vehicle by means of the two bars 26, to which reference has already been made. The rear ends of bars 26 are secured to the side members by means of clamps 38 and they are supported from the base member 28 by means of supporting strips or clamps 39. Tension members 40 have their front ends pivotally connected with the inclined bars 20 by means of pivots 41 whose positions may be shifted to either one of several openings provided in bars 20 for this purpose. The rear ends of tension members 40 are secured to the crank arms of a power operated tool hoist 42. When the bars 40 are moved rearwardly the rake head will be tilted counter-crosswise, when viewed as in Figure 1, about its pivotal connections with the front ends of supporting bars 26.

From the above description it will be apparent that whenever a sweep rake is supported by the vehicle which, in turn is connected with a tractor or other type of automotive vehicle, the operation of the rake can be readily controlled by the driver of the tractor. The forwardly acting force exerted by the tractor is transmitted to the rake head through the sides 27 of the supporting vehicle. The rake head is pivotally supported from the ends of bars 26 and the diagonal braces 33, prevent relative lateral movement between the tractor and the supporting vehicle. Although the means for preventing lateral movement with respect to the tractor has been illustrated as comprising the diagonal braces 33, it is evident that any equivalent means can be substituted. Since such connection must permit free relative vertical movement between the tractor and the supporting vehicle the same results can be obtained by flexible tension members extending in both directions from the tractor, if such construction should be found preferable to the one illustrated.

The distance from the plane of the rake teeth to the pivotal connection between the rake head and the supporting bars 26, can be adjusted so as to change the ground pressure exerted by the mechanism during operation.

When the rake is in operation the parts are positioned, as shown in Figure 1, but when a load has been gathered the operator can move the tool hoist 42 into operative position, whereupon the tension rods 40 are moved rearwardly thereupon turning the rake head in a counterclockwise direction. The load will be held in this position by the action of the tool hoist.

It is evident from the above description that by supporting the rake head from a separate vehicle the tractor will not be required to support the weight of the rake head and its load, as it must do when the construction employed in some of the prior art power operated sweep rakes is used. It is very clear from an inspection of Figure 1 that a heavy load carried by the rake head would add a great amount of weight to the front wheels if the sides 27 were supported from the tractor while the load is transported and such excessive loads have been known to injure the front wheel tires of the tractors and cause blow-outs and breakdowns.

By supporting the front ends of side members 27 on caster wheels and providing braces 33 between the rake supporting vehicle and the tractor, it becomes possible to make sharp turns with the tractor, which greatly facilitates the transportation of the load to the stack. If the rake supporting vehicle is supported on wheels that have no caster action, as shown, for example, in U. S. Patents Nos. 1,980,762; 2,185,794 and 1,654,326, a different and very unsatisfactory method of steering is required which does not permit sharp turns to be made.

In Figure 5 an adjustable device has been illustrated for effecting a connection with the tractor. This device consists of a tube 43 that is welded to bars 44 and which is clamped in position on the ends of the frame members 27 by means of plates 45 and bolts 46. A pull bar 47 extends through the tube 43 and this bar has spaced diametrical openings 48 for the reception of bolts that may be shifted from one opening to another so as to obtain the proper adjustment. Plates 49 are welded or otherwise secured to the pull bar and have openings for the reception of a bolt 50 by means of which an attachment is made with the tool hitch of the tractor.

The mechanism shown in Figure 5 and described above permits the frame to rock about the axis of the pull bar and also permits adjustments to be made to suit the rake carrying vehicle to tractors of different makes.

Having described the invention, what is claimed as new is:

1. A power operated load moving machine, comprising in combination, a tractor, a load supporting vehicle attached thereto, said vehicle comprising a frame that encloses the front wheels of the tractor, means for effecting a movable connection between the frame and the tractor at a point to the rear of the front wheels thereof, means for resisting relative transverse movement of the frame and the tractor while permitting relative vertical movement, a pair of caster wheels attached to the front end of the frame for supporting the front end independently of the tractor, and a load carrying device supported by the vehicle.

2. A power operated load moving machine, comprising in combination, a tractor, a load supporting vehicle attached thereto, said vehicle comprising a frame that encloses the front wheels of the tractor, means for effecting a movable connection between the frame and the tractor at a point to the rear of the front wheels thereof, means for resisting relative transverse movement of the frame and the tractor while permitting relative vertical movement, a pair of caster wheels attached to the front end of the frame for supporting the front end independently of the tractor, a pair of rigid support bars secured to the frame and projecting forwardly beyond the front end thereof, and a load carrying device supported by the bars for movement about a horizontal pivot.

3. In a power operated sweep rake, a rake supporting vehicle having a frame in the form of an isosceles triangle in which the sides extend beyond the base, a caster wheel attached to the end of each side, and support bars attached to the sides and the base, said bars projecting forwardly of the base for tiltably supporting a rake head.

4. In a power operated sweep rake of the type in which the power is derived from a tractor, a rake supporting vehicle for attachment to the tractor, the vehicle comprising a frame which encircles the front wheels of the tractor and is provided at its rear end with means for movably attaching it to the tractor, caster wheels secured to the frame near its front end, for supporting the front end independently of the tractor, means connecting the frame with the front end of the tractor for resisting relative transverse movement while permitting relative vertical movement, and means secured to the frame and projecting forwardly thereof for supporting a rake head.

JOSEPH H. COPE.
GAROLD C. J. GRAY.